(12) United States Patent
Hashish

(10) Patent No.: US 9,154,008 B2
(45) Date of Patent: Oct. 6, 2015

(54) HYBRID ROTOR BAR ASSEMBLIES, ELECTRIC MOTORS INCLUDING HYBRID ROTOR BAR ASSEMBLIES, AND METHODS OF ASSEMBLYING SAME

(71) Applicant: Siemens Industry, Inc., Alpharetta, GA (US)

(72) Inventor: Emam Hashish, Cincinnati, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 192 days.

(21) Appl. No.: 13/633,632

(22) Filed: Oct. 2, 2012

(65) Prior Publication Data

US 2014/0091668 A1    Apr. 3, 2014

(51) Int. Cl.
| | |
|---|---|
| H02K 17/16 | (2006.01) |
| H02K 3/02 | (2006.01) |
| H02K 15/00 | (2006.01) |
| H02K 17/18 | (2006.01) |

(52) U.S. Cl.
CPC .............. *H02K 3/02* (2013.01); *H02K 15/0012* (2013.01); *H02K 17/165* (2013.01); *H02K 17/185* (2013.01); *Y10T 29/49012* (2015.01)

(58) Field of Classification Search
None
See application file for complete search history.

(56) References Cited

U.S. PATENT DOCUMENTS

| | | | | |
|---|---|---|---|---|
| 4,360,411 | A | * | 11/1982 | Ladet et al. .................. 205/184 |
| 4,475,960 | A | * | 10/1984 | Yamawaki et al. ............. 148/26 |
| 5,283,941 | A | * | 2/1994 | Meyer et al. ................... 29/598 |
| 5,398,404 | A | | 3/1995 | Flynn |
| 6,092,277 | A | | 7/2000 | Beltowski |
| 6,164,517 | A | * | 12/2000 | Kim ............................ 228/56.3 |
| 6,345,433 | B1 | * | 2/2002 | Kliman et al. ................. 29/598 |
| 6,534,891 | B2 | * | 3/2003 | Kliman et al. ................ 310/211 |
| 7,851,961 | B2 | * | 12/2010 | Lang et al. .................... 310/211 |
| 2005/0040726 | A1 | * | 2/2005 | Sato ............................. 310/211 |
| 2005/0155750 | A1 | * | 7/2005 | Mitchell et al. .............. 165/182 |
| 2009/0173483 | A1 | * | 7/2009 | Beamer et al. ................ 165/173 |
| 2009/0285956 | A1 | * | 11/2009 | Landers et al. ............... 426/477 |
| 2011/0291516 | A1 | * | 12/2011 | Alexander et al. ........... 310/211 |
| 2012/0187796 | A1 | * | 7/2012 | Buttner et al. ................ 310/211 |
| 2012/0228985 | A1 | * | 9/2012 | Hayahi et al. ................ 310/211 |

FOREIGN PATENT DOCUMENTS

| | | | | | |
|---|---|---|---|---|---|
| JP | 08223878 | A | * | 8/1996 | ............. H02K 17/16 |
| JP | 09074726 | A | * | 3/1997 | ............. H02K 17/16 |

* cited by examiner

*Primary Examiner* — Tran Nguyen

(57) ABSTRACT

Hybrid rotor bar assemblies and electric motors having hybrid rotor bar assemblies are disclosed, as are other aspects. The hybrid rotor tar assemblies have rotor bars lined with shims. The rotor bars can be copper rotor bars. In certain aspects, the shim may be about one fourth to about one eighth of a thickness of the rotor bar. Also disclosed are electric motors with shims lining the rotor bars and functioning as secondary rotor bars.

11 Claims, 4 Drawing Sheets

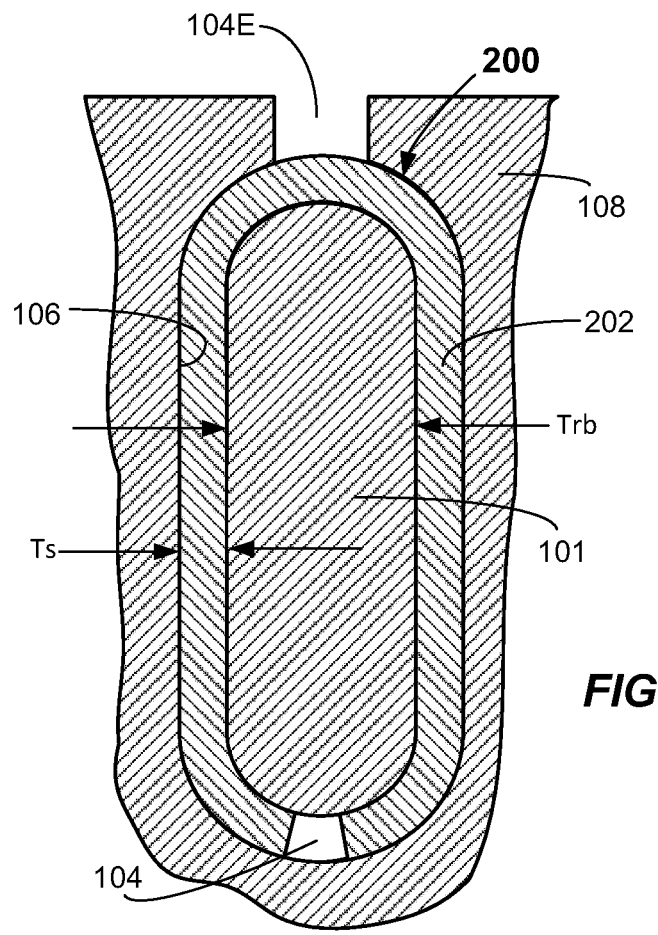
FIG. 2A
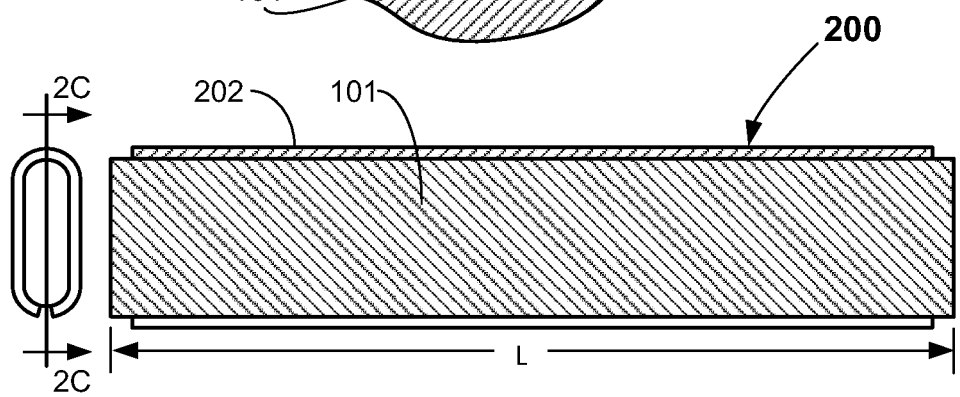
FIG. 2B    FIG. 2C

HYBRID ROTOR BAR ASSEMBLIES, ELECTRIC MOTORS INCLUDING HYBRID ROTOR BAR ASSEMBLIES, AND METHODS OF ASSEMBLYING SAME

FIELD

The present invention relates generally to electric induction motors, and more particularly to rotor bars of such electric induction motors.

BACKGROUND

An electric motor (e.g., an induction motor), typically comprises a stator and a rotor core assembly that is rotatable in relation to the stator. The rotor core assembly may include a plurality of aligned laminated plates. The so-called squirrel cage of the rotor core assembly may include a plurality of rotor bars inserted through radial slots formed in plurality of aligned laminated plates. Rotor bars often are copper rotor bars, especially for medium-sized and large-sized motors. Copper's greater conductivity versus other materials, such as aluminum, enhances the electrical energy efficiency of motors. Accordingly, induction motors with copper rotor bars have higher breakdown torque. However, motors having such copper rotor bars have lower starting motor torque. Copper rotor bars are relatively expensive.

Loose rotor bars may sometimes be a source of rotor Failure. One conventional way to tighten the copper rotor bars is using than steel shims to line alongside of the rotor bars. These conventional thin steel shims are sized appropriately to ensure that the rotor bars are relatively tightly secured in the slot. Typically, these thin mild steel shims are about 0.01 inch to 0.015 inch. (0.25 mm to 0.38 mm) in thickness and function to tighten the rotor bars and to provide a barrier between the rotor bars and the laminated plates of the rotor assembly so as not to shave or abrade the soft copper rotor bars as they expand and shrink.

There still exists a need for improved electric induction motors having rotor bars that are not only sufficiently tightly held within the slot, but have high breakdown torque and also improved starting motor torque.

SUMMARY

In one aspect, an electric motor, rotor bar assembly is provided. The electric motor, rotor bar assembly includes a rotor bar, and an aluminum shim lining the rotor bar.

In another aspect, an induction motor is provided. The induction motor includes a laminated rotor having one or more slots formed in a radial periphery thereof, and one or more hybrid rotor bar assemblies received in the one or more slots, each hybrid rotor bar assembly having a rotor bar, and a shim at least partially surrounding the rotor bar and functioning as a secondary rotor bar.

In another aspect, an electric motor, rotor bar assembly is provided. The electric motor, rotor bar assembly includes a copper rotor bar, and an aluminum shim lining the copper rotor bar and at least partially surrounding the copper rotor bar wherein a thickness of the aluminum shim is about one fourth to about one eighth of a thickness of the rotor bar.

In a method aspect, a method of assembly a rotor core assembly is provided. The assembly method includes providing a rotor core comprising laminated discs having slots aligned along a radial periphery, providing one or more hybrid rotor bar assemblies having a copper rotor bar lined by an aluminum shim, and inserting one or more of the hybrid rotor bar assemblies into one or more of the slots.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

BRIEF DESCRIPTION OF DRAWINGS

FIG. 2A illustrates a cross-sectioned view of an alternative hybrid rotor bar shown inserted through a slot of a rotor assembly according to embodiments.

FIG. 2B illustrates an end plan view of an alternative hybrid rotor bar of FIG. 2A according to embodiments.

FIG. 2C illustrates a cross-section side view of the hybrid rotor bar of FIG. 2B taken along section line 2C-2C according to embodiments.

DESCRIPTION

Figure 1A:
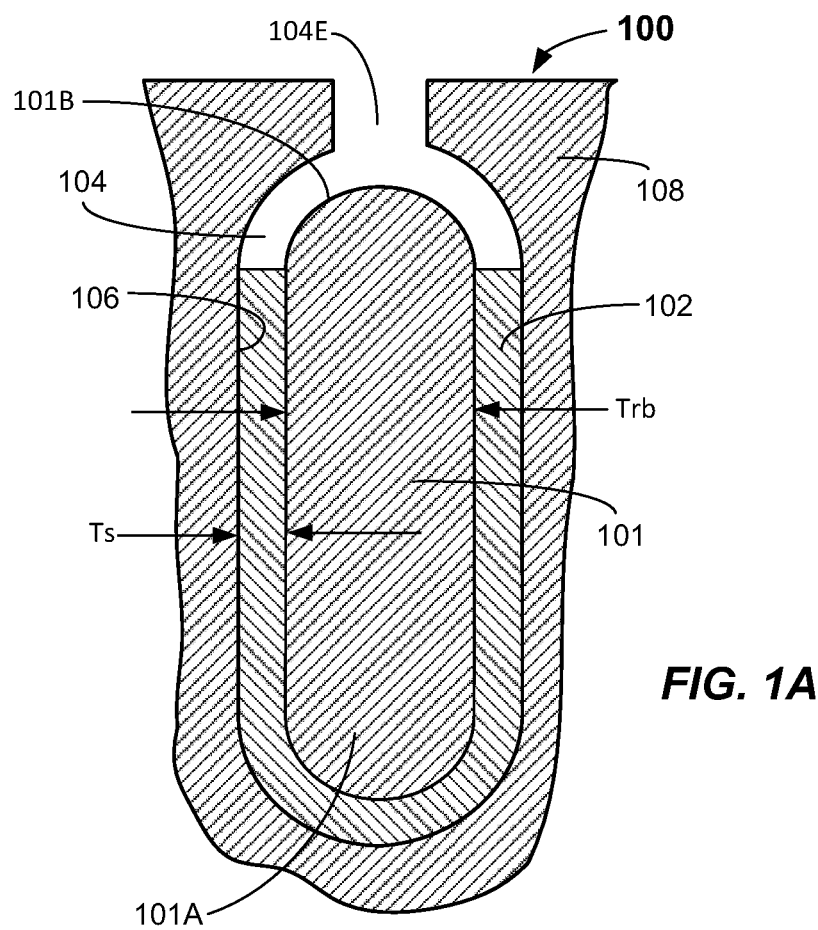
FIG. 1a illustrates a cross-sectioned view of a hybrid rotor bar shown inserted through a slot of a rotor assembly according to embodiments.

In view of the foregoing difficulties, an improved electric motor is provided. The electric motor includes a rotor bar assembly having a rotor bar and a shim lining the rotor bar that functions as a "secondary rotor bar." In one embodiment of the invention, the shim is thicker than a conventional shim (e.g., about 0.06 inch or greater; about 1.52 mm or greater) and is made of an aluminum material, whereas conventional shims are made of mild steel and are relatively thin, typically about 0.01 inch to 0.015 inch (0.25 mm to 0.38 mm) thick. The thickness of the aluminum shims according to one or more embodiments of the present invention is greater than that of conventional shims and can be tailored to specific motor's characteristics and requirements.

In certain embodiments, the thickness (Ts) of the aluminum shim of the rotor bar assembly can be about one fourth to about one eighth of a thickness (Trb) of the rotor bar. The rotor bar can be a copper rotor bar. The rotor bar can also be made of other materials, such as aluminum. The shim of this invention functions not only as a shim, i.e., to tighten the rotor bars and to provide an abrasion barrier adjacent to the rotor laminate so as not to shave the soft copper bars as they expand and shrink, but also as a secondary rotor bar. The aluminum is generally softer than copper and provides better protection for the copper bar than steel shims used in the prior art. Additionally, aluminum has a relatively high coefficient of thermal expansion (higher than the surrounding laminated plates of the rotor core), and thus the thick aluminum shims make the copper bars even tighter in the slots at high temperatures than do conventional shims. The aluminum shim functions as a second rotor bar because aluminum, having relatively electrical high resistance, results in increased starting motor torque, while the copper rotor bar helps to enhance electrical energy efficiency of the motors and results in higher breakdown torque of the motors. Electric motors using the rotor bar assembly, according to embodiments, can be any sized electric motors, including medium and large motors. The electric motor can be any type of electric motor using rotor bars, such as an electric induction motor. In some embodiments, the shim may line less than all of the radial periphery of the shim. For example, the aluminum shim can line the rotor bar substantially but not completely about a radial periphery (e.g., 80% or more).

As will become apparent from the various embodiments, improved electric motors may be provided having aluminum shims lining the rotor bars. The improved motors (e.g., induction motors) may advantageously exhibit one or more of an improved ability to tighten rotor bars, increased starting torque, and/or improved barrier with the rotor laminates so as not to shave the soft copper rotor bars as they expand and shrink. The aluminum shim may also provide a cost effective secondary rotor bar, and may increase starting torque.

These and other embodiments of the improved rotor bar assemblies, rotor assemblies including the rotor bar assemblies, and electric motors the improved rotor bar assemblies according to embodiments of the invention are described below with reference to FIGS. 1-4 herein. The drawings are not necessarily drawn to scale. Like numerals are used throughout to denote like elements.

Figures 1B, 1C:
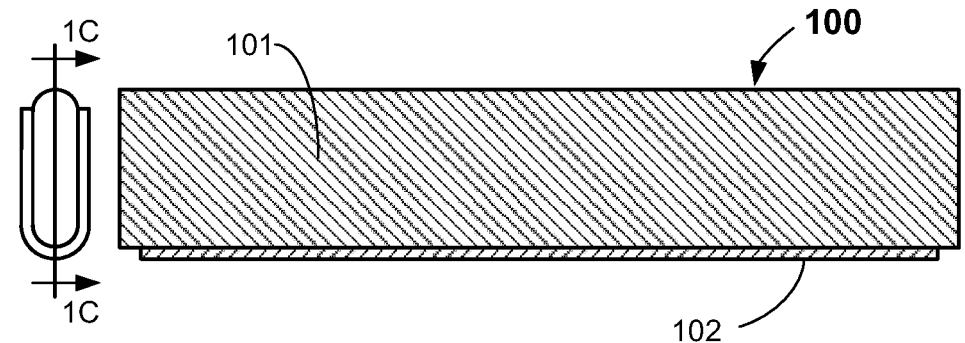
FIG. 1B illustrates an end plan view of the hybrid rotor bar of FIG. 1A according to embodiments.
FIG. 1C illustrates a cross-section side view of the hybrid rotor bar of FIG. 1B taken along section line 1C-1C according to embodiments.

Referring now in specific detail, to FIGS. 1A-1C, several views of a hybrid rotor bar assembly 100 adapted for use in a rotor assembly of an electric motor (e.g., an electric induction motor) is shown. The hybrid rotor bar assembly 100 has a rotor bar 101 that may be made of a copper material, lined by a shim 102 that is relatively thick. The thickness of the shim 102 is tailored to specific motor's characteristics and requirements. In one or more embodiments, the shim 102 is aluminum material, such as UNS A91100 aluminum sheet. The thickness (Ts) of the shim 102 can be about one fourth to about one eighth of the thickness (Trb) of the rotor bar 101, for example. For example, in one embodiment, the thickness (Ts) of the shim 102 may be between about 0.06 inch (1.52 mm) to about 0.15 inch (3.81 mm). The hybrid rotor bar assembly 100 is received in a slot 104 and is provided in contact with a rotor surface 106 of the laminated rotor package 108. One or more laminated rotor packages may be provided in the rotor assembly. One or more vent spacers may be provided, as well. In some embodiments, the shim 102 may be secured to the rotor bar 101, such as by braising. The hybrid rotor bar assembly 100 may be received in a slot 104 in a relative tight manner, such as with a slight press fit. In other embodiments, a slight gap may be provided between the shim 102 and the slot 104.

The laminated rotor package 108 may be a series of axially-stacked laminated plates, each having a plurality of slots 104 arranged around a radial periphery thereof. The laminated plates may be a ferrous material such as steel (e.g., C5 core plate material, or the like). Other materials may be used. The series of axially-stacked laminated plates may be disc-shaped plates may be aligned on a shaft (e.g., shaft 327—FIG. 3) by a key received in a keyway formed in the laminated plates. Other alignment means may be provided.

The hybrid rotor bar assembly 100 is received in some, and preferably all, of the respective slots 104 and extends axially in an orientation that is generally parallel to the axis of the shaft 327. The shim 102 (e.g., aluminum shim) is provided to line the rotor bar 101 substantially, but not completely (80% or more) in some embodiments. For example, as shown in FIG. 1A, the shim 102 may wrap around a radial periphery of the rotor bar 101 and wrap fully around one end 101A away from the slot exit 104E of the slot 104, but leave the other end 101B unlined. "Lining" as used herein means providing a covering over an outer surface of the rotor bar 101 by being provided in close proximity and contact therewith.

Referring now in specific detail to FIG. 2A-2C, a hybrid rotor bar assembly 200 adapted for use in an electric motor (e.g., an induction motor) is shown. The hybrid rotor bar assembly 200 has a rotor bar 101 (e.g., made of copper) as previously described, that is lined by an aluminum shim 202. The thickness of the aluminum shim 202 is tailored to specific motor's characteristics and requirements and can be about one fourth to about one eighth of the thickness (Trb) of the rotor bar 101, in some embodiments as previously described. The hybrid rotor bar assembly 200 is in contact with a surface 106 of the slot 104, as shown. The aluminum shim 202 lines the rotor bar 101 substantially around its radial periphery (e.g., along more than 80% of its radial periphery or more). However, the aluminum shim 202 may not line the rotor bar 101 completely, as shown in FIG. 2A. The aluminum shim 202 may line the rotor bar 101 continuously except at a point or over a small arc segment opposite from the exit 104E of the slot 104 from the rotor 108. In one or more embodiments herein the thickness (Ts) of the shim may be substantially constant along a length thereof, as well as about she radial periphery (except for where the rotor bar is unlined).

As shown in FIGS. 2B and 2C, respective end and cross-sectioned side views of the hybrid rotor bar assembly 200 are shown. The rotor bar 101, as previously described, includes a length L. The aluminum shim 202 lines the rotor bar 101 substantially along the length L. However, the shim 202 is shorter than the length L. Only an end portion that will extend beyond the laminated rotor body (as installed) may be unlined, for example.

Figure 3:
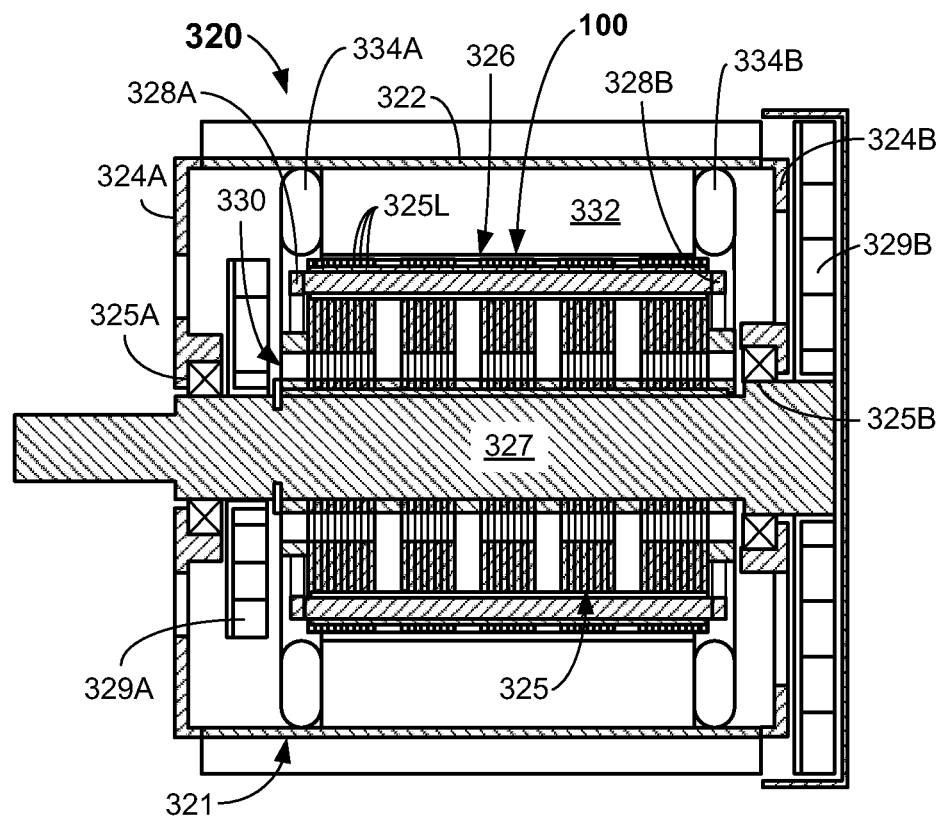
FIG. 3 illustrates a cross-sectioned side view of an induction motor including a rotor core assembly having a hybrid rotor bar assembly according to embodiments.

FIG. 3 illustrates, an electric motor 320, such as an electrical induction motor, including a plurality of the inventive hybrid rotor bar assemblies 100 of the type described herein. Optionally, the hybrid rotor bar assemblies 100 may be of the type described with reference to FIGS. 2A-2C. The induction motor 320 may include a motor housing 321 having a center portion 322 and connected end portions 324A, 324B. Other housing structures may be used. The ends 324A, 324B may include bearings 325A, 325B that support a rotor core assembly 326 on a shaft 327 thereof. The rotor core assembly 326 includes a rotor core made up of a plurality of laminated steel discs, each having one or more slots, and in the depicted embodiment, a plurality of slots formed at a radial periphery thereof. The slots are aligned axially. One or more, and in the depicted embodiment, a plurality of the hybrid rotor bars 100 are received in one or more, and preferably each of the peripherally-located slots 108 (FIG. 1). The hybrid rotor bars 100 may be of the construction described herein, and may be tied together and coupled with end members 328A, 328B. For example, the ends of the hybrid rotor bars 100 may be braised to the end members 328A, 328B, which may be copper rings. One or more fans 329A, 329B may be provided on one or both ends of the; induction motor 320 to provide air flow to the axial vents 330 and aid in cooling of the rotor core assembly 326. The rotor core assembly 326 resides adjacent to the stator 332 and the coils 334A, 334B, which are of conventional construction.

Figure 4:
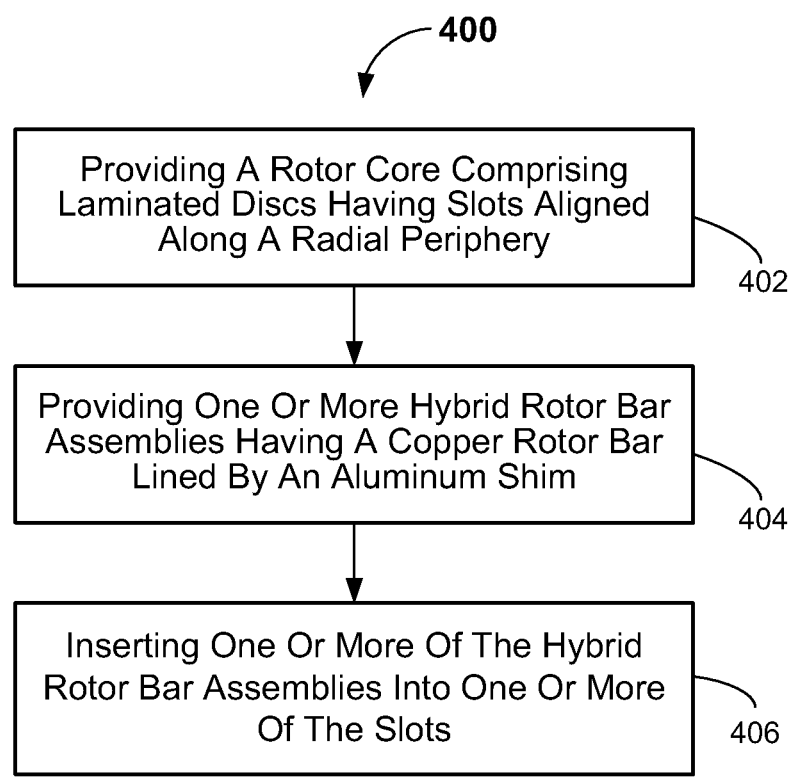
FIG. 4 illustrates a flowchart of a method of assembly a rotor core assembly according to embodiments.

FIG. 4 illustrates a flowchart of a method of assembling an electric motor (e.g., an induction motor 320) having a rotor core assembly (e.g., rotor core assembly 326) according to embodiments. The method 400 includes, in 402, providing a rotor core 325 comprising stacked laminated discs 325L having slots (e.g., slots 108) aligned along a radial periphery, providing one or more hybrid rotor bar assemblies (e.g., hybrid rotor bar assemblies 100 or 200) having a copper rotor bar lined by an aluminum shim, and, in 406, inserting the one or more of the hybrid rotor bar assemblies (e.g., hybrid rotor bar assemblies 100 or 200) into one or more of the slots (e.g., slots 108).

While the invention is susceptible to various modifications and alternative forms, specific embodiments and methods thereof have been shown by way of example in the drawings and are described in detail herein, it should be understood, however, that it is not intended to limit the invention to the particular apparatus, systems, or methods disclosed, but, to the contrary, the intention is to cover all modifications, equivalents and alternatives failing within the scope of the invention.

What is claimed is:

1. A rotor bar assembly, comprising:
a rotor bar configured to be received in a slot with a slot exit of a rotor package; and
an aluminum shim substantially lining the rotor bar about a radial periphery,
wherein the aluminum shim lines the rotor bar continuously except over a small arc segment opposite from the slot exit of the slot,
wherein a thickness of the aluminum shim is about one fourth to about one eighth of a thickness of the rotor bar, and wherein the aluminum shim is secured to the rotor bar by brazing.

2. The rotor bar assembly of claim 1, wherein the rotor bar is copper.

3. An induction motor, comprising:
a laminated rotor having a plurality of slots formed in a radial periphery thereof, each slot having a slot exit; and
a plurality of hybrid rotor bar assemblies received in the plurality of slots, each rotor bar assembly having
a rotor bar, and
a shim partially surrounding and lining the rotor bar and functioning as a secondary rotor bar, the rotor bar comprising an unlined segment opposite from the slot exit, wherein the shim is secured to the rotor bar by brazing.

4. The induction motor according to claim 3, wherein the shim is an aluminum shim.

5. The induction motor according to claim 3, wherein a thickness of the shim is about one fourth to about one eighth of a thickness of the rotor bar.

6. The induction motor according to claim 3, wherein the rotor bar is a copper rotor bar.

7. The induction motor according to claim 6, wherein the shim is aluminum, and lines the copper rotor bar substantially, but not completely.

8. A rotor bar assembly, comprising:
a copper rotor bar configured to be received in a slot with a slot exit of a laminated rotor package; and
an aluminum shim lining the copper rotor bar and at least partially surrounding the copper rotor bar,
wherein the aluminum shim lines the rotor bar continuously except over a small arc segment opposite from the slot exit of the laminated rotor package, and
wherein a thickness of the aluminum shim is about one fourth to about one eighth of a thickness of the rotor bar, and wherein the aluminum shim is secured to the copper rotor bar by brazing.

9. A method of assembly a rotor core assembly, comprising:
providing a rotor core comprising laminated discs having a plurality of slots aligned along a radial periphery, each slot comprising a slot exit;
providing a plurality of hybrid rotor bar assemblies each having a copper rotor bar lined by an aluminum shim, each copper rotor bar comprising an unlined segment, wherein the aluminum shim is secured to the copper rotor bar by brazing; and
inserting the plurality of hybrid rotor bar assemblies into the plurality of slots such that the unlined segments are opposite from to the slot exits.

10. The method as claimed in claim 9, wherein the aluminum shim lines the copper rotor bar substantially about a radial periphery, but not completely.

11. The method as claimed in claim 9, wherein a thickness of the aluminum shim is about one fourth to about one eighth of a thickness of the copper rotor bar.

* * * * *

UNITED STATES PATENT AND TRADEMARK OFFICE
CERTIFICATE OF CORRECTION

| | | |
|---|---|---|
| PATENT NO. | : 9,154,008 B2 | Page 1 of 1 |
| APPLICATION NO. | : 13/633632 | |
| DATED | : October 6, 2015 | |
| INVENTOR(S) | : Emam Hashish | |

It is certified that error appears in the above-identified patent and that said Letters Patent is hereby corrected as shown below:

On the Title Page, delete the title of the invention: Item (54) and insert this corrected Title.
--HYBRID ROTOR BAR ASSEMBLIES, ELECTRIC MOTORS INCLUDING HYBRID ROTOR BAR ASSEMBLIES, AND METHODS OF ASSEMBLING SAME--

Signed and Sealed this
Fifth Day of April, 2016

Michelle K. Lee
*Director of the United States Patent and Trademark Office*